2,773,108

ETHYLATION PROCESS

Edwin F. Peters, Lansing, Ill., assignor to Standard Oil Company, Chicago, Ill., a corporation of Indiana No Drawing. Application October 29, 1954, Serial No. 465,754

5 Claims. (Cl. 260—671)

This invention relates to a process for the ethylation of aromatic compounds, particularly aromatic hydrocarbons, by reaction thereof with ethylene in the presence of an acidic solid catalyst consisting essentially of silica and alumina acid free of other catalytic metals or metal oxides. In one specific aspect, this invention relates to a process for the ethylation of benzene by ethylene at low temperatures in the presence of acidic silica-alumina catalysts.

One object of my invention is to provide highly active, acidic, silica-alumina catalysts for the ethylation of aromatic compounds, particularly aromatic hydrocarbons. Another object is to provide active alkylation catalysts which can be employed, particularly for ethylations with ethylene, at substantially lower temperatures than catalysts of the same sort which have not been subjected to activation with hydrogen as will be hereinafter described. An additional object is to provide a low temperature process for the synthesis of ethylbenzene and polyethylbenzenes. These and other objects of my invention will become apparent from the ensuing description thereof.

The reaction of benzene with ethylene to produce ethylbenzene and polyethylbenzenes in the presence of acidic silica-alumina catalysts is well-known. The catalysts which are employed consist essentially of a major proportion by weight of silica and a minor proportion by weight of alumina. Acidic silica-alumina catalysts have found their greatest commercial use in the catalytic cracking of hydrocarbon oils such as gas oils. Their commercial importance has followed upon numerous studies of their structure and their properties for the conversion of hydrocarbons. They have been the subject of authoritative articles such as the one by A. G. Oblad et al., "Chemical Characteristics and Structure of Cracking Catalysts" in "Advances in Catalysis" (Academic Press, Inc., New York, New York, 1951) volume III; R. C. Hansford, "Chemical Concepts of Catalytic Cracking," and H. E. Ries, Jr., "Structure and Sintering Properties of Cracking Catalysts and Related Materials," both in volume IV of "Advances in Catalysis." The chemical compositions of various commercial acidic solid cracking catalysts are supplied in the publication by Dr. Ries, page 94 and following.

The conversion of silica to an acidic catalyst requires the addition of only a very small proportion of alumina, although commercial catalysts may contain as much as 25 weight percent of alumina. The acidic silica-alumina catalysts in the so-called "dry" state may contain about 1 to 10 weight percent water; some water is carried as hydroxyl groups on the surface of the catalyst (R. C. Hansford, infra, page 7; and A. G. Oblad, infra, pages 210 and 211). The acid strength of solid materials can be determined by the method of Cheves Walling (J. Am. Chem. Soc. 72, 1164 (1950)) or other methods known in the art.

The use of acidic silica-alumina catalysts for the vapor phase alkylation of benzene with low molecular weight olefins has been reviewed and studied experimentally by A. A. O'Kelly et al. (Ind. Eng. Chem. 39, 154–8 (February 1947)). These investigators employed temperatures of 322° C. to 399° C. (about 612° F. to 750° F.), in batch vapor phase ethylations of benzene with ethylene in the presence of a synthetic silica-alumina catalyst. They employed temperatures of 428° C. to 496° (about 802° F. to 924° F.) in continuous operations.

In the commercial production of ethylbenzene by the reaction of benzene with ethylene under high pressures of the order of 900 p. s. i. g. in the presence of a silica-alumina catalyst, temperatures of 590° F. and higher are employed (F. R. Garner and R. L. Iverson, "Ethylbenzene as a Major Petrochemical," a paper presented as a part of a "Symposium on Petrochemicals in the Post-war Years—No. 28," sponsored by the Division of Petroleum Chemistry of the American Chemical Society, September 6–11, 1953).

Typical ethylations of benzene in the liquid phase in the presence of silica-alumina catalysts and the like require temperatures of at least 400° F. and preferably at least 475° F., (U. S. P. 2,419,796).

My invention relates to the ethylation with ethylene of benzene or other aromatic hydrocarbons in the presence of activated acidic silica-alumina catalysts such as have been described briefly above. These catalysts may be synthetic composites or they may be montmorilonitic clays, such as Super Filtrol or the like. The clays are usually sold in commerce as the products of an acid treatment which functions to activate them; they may also be sold as fluorided materials.

I have discovered that acidic silica-alumina catalysts can be greatly activated for use in the ethylation of aromatic hydrocarbons such as benzene by contacting these catalysts with hydrogen under activating conditions. These conditions include temperatures within the range of about 400° F. to about 1000° F., more often temperatures between about 500° F. and about 800° F. The hydrogen is pressured into contact with the catalyst at superatmospheric pressure, e. g., at hydrogen partial pressure ranges of about 20 to 1000, 2000 p. s. i. or even more. The period of contacting the catalyst with hydrogen can be varied between about 15 minutes to about 2.5 hours, or even more. The hydrogen activation may be applied to fresh or regenerated catalysts.

In one desirable method of preparing a highly active catalyst, the acidic silica-alumina catalyst may be first subjected to a dehydration treatment which will serve to remove substantially all of the water which is not chemically bound within the catalyst. Suitable dehydration treatments are well-known in the art and include, for example, a calcination of the catalyst at temperatures ranging between about 400° F. and about 1000° F. at atmospheric or subatmospheric pressures (preferably while evacuating the catalyst at pressures of the order of 1 mm. of mercury or even less) for a suitable period of time to effect substantial dehydration, for example, between about 15 minutes and about 3 hours. The function or functions of hydrogen in the activation process are not understood, but its activation effects on acidic silica-alumina catalysts have been empirically established by decisive experimental studies which I have made.

The catalysts prepared by the above-described hydrogen activation treatment can be employed for the ethylation of benzene or other aromatic hydrocarbons with ethylene at temperatures between about 100° F. and about 350° F., although higher temperatures of about 400° F. or more need not be excluded but are unnecessary. Good conversions of ethylene are obtained under these low temperature conditions at which conventional acidic silica-alumina catalysts would either be inoperative or would exhibit only a slight tendency to convert ethylene.

A wide variety of aromatic hydrocarbons may be subjected to ethylation in accordance with this invention, although currently benzene appears to be the charging stock of greatest commercial importance. Other aromatic hydrocarbon charging stocks include alkylbenzenes such as toluene, xylenes, ethylbenzene, cumene, diethylbenzenes, butylbenzenes, etc.; bicyclic aromatic hydrocarbons such as naphthalene, methyl naphthalenes, and the like; polycyclic aromatic hydrocarbons such as anthracene and phenanthrene, their alkyl derivatives, and the like. Aromatic hydrocarbons may be subjected to ethylation when dissolved in an inert solvent such as a paraffinic hydrocarbon.

The ethylene stream which is employed for ethylation may contain methane, ethane, hydrogen, etc., but to avoid corrosion of equipment, it should be substantially free of water and hydrogen sulfide or other sulfur compounds. If higher olefins are present in the ethylene stream, they too will alkylate the aromatic hydrocarbon charging stock.

The aromatic hydrocarbon which is subjected to ethylation may be present in the reaction zone as a liquid phase, vapor phase, or both, control of the phase relations being obtained in the usual manner. The molar ratio of aromatic hydrocarbon to ethylene may be adjusted to obtain the desired distribution of ethylation products, it being well-known that a substantial molar excess of aromatic hydrocarbon of the order of at least 2, but preferably at least 5, is required in order to avoid excessive production of polyethylation products. In batch operations, a suitable period of time will be provided to allow substantial conversion of the ethylene, such periods being of the order of 1 to 10 hours, more or less. In continuous flow operations, liquid hourly space velocities (aromatic hydrocarbon) may range from about 0.1 to about 5 and is usually of the order of about 1 or 2.

The present process may be carried out in conventional batch or continuous equipment, provided with suitable means for effecting intimate contacting of the catalyst, ethylene, and aromatic hydrocarbon. Separation of the reaction product can be effected by fractional distillation, with recycle of excess aromatic hydrocarbon to the alkylation process, together with unconverted ethylene and any undesired polyethylation products which are produced, as is well-known in the art.

The following is a non-limitative example of my invention:

The catalyst (73 wt. percent silica and 27 wt. percent alumina) was activated by heating at 662° F. for one hour under a pressure of 1 mm. of mercury followed by treatment for one hour at 662° F. with hydrogen at a partial pressure of 1000 p. s. i. g. The catalyst (56 g.) was charged under a blanket of hydrogen to a reactor to which were charged 2.8 mols of benzene and 2.64 mols of ethylene. The reaction was effected at 302° F. and an initial pressure of 1000 p. s. i. over a period of 5 hours. The benzene was present mostly as a liquid phase under these conditions. It was found that 68 wt. percent of the ethylene was converted and that 135 grams of alkylate were produced having the following composition:

| Product: | Volume percent |
|---|---|
| Ethylbenzene | 60 |
| Diethylbenzene | 20 |
| Triethylbenzene | 12 |
| Bottoms | 8 |

The results obtained in the exemplary operation of the invention are in sharp contrast to those obtained in the following experiment:

A silica-alumina catalyst (21 g.) prepared from the same batch as that used in the example was heated in the reactor at 662° F. for one-half hour while evacuating to 1 mm. of mercury and was then treated with nitrogen for 30 minutes at 662° F. under a pressure of 600 p. s. i. The charge of 0.75 mol of ethylene and 1.7 mol of benzene was then added to the reactor. Reaction was effected at 302° F. and an initial pressure of 1000 p. s. i. At the end of 4 hours, pressure drop in the reaction zone was inappreciable and it was therefore concluded that the reaction had ended. It was found that only 19 weight percent of the ethylene was converted and that 12 grams of product were produced. The product consisted of diethylbenzene. It can be calculated that 24 mol percent of the ethylene was converted to diethylbenzene. It will be noted that the activity of the catalyst was far less than that of the catalyst activated with hydrogen in the above example.

Surprisingly, I have found that the hydrogen activation treatment of my invention could not be extended to silica-magnesia catalysts which are well known in the petroleum refining art as substantial equivalents for silica-alumina catalysts for use in the catalytic cracking of high boiling hydrocarbon oils to produce principally gasoline boiling range hydrocarbons. Thus, 74 g. of a catalyst having the composition 83.4 weight percent silica and 16.6 weight percent MgO were calcined at 662° F. under the pressure of 1 mm. of mercury for 1 hour, then treated with hydrogen at 662° F. under a partial hydrogen pressure of 1600 p. s. i. for one hour. The reactor containing the catalyst was charged with 88 g. of benzene and 22 g. of ethylene, and the contents were heated at 304° F. for 3 hours under a pressure of 1000 p. s. i. g. No pressure drop was noted and it was found that none of the ethylene had been converted to alkylate.

Having thus described my invention, what I claim is:

1. A process for the ethylation of an aromatic hydrocarbon, which process comprises contacting said aromatic hydrocarbons with ethylene at a temperature between about 100° F. and about 350° F. in the presence of an acidic catalyst consisting essentially of a major proportion by weight of silica and a minor proportion by weight of alumina, which catalyst has been activated before use in said ethylation by treatment with hydrogen under a pressure of at least about 20 p. s. i. at a temperature between about 400° F. and about 1000° F. for a period of time sufficient to effect substantial activation of said catalyst for said ethylation of an aromatic hydrocarbon.

2. The process of claim 1 wherein said aromatic hydrocarbon is benzene.

3. The process of claim 1 wherein said catalyst contains about 1 to about 25 weight percent of alumina.

4. A process for the ethylation of benzene which comprises contacting benzene under pressure sufficient to maintain a liquid phase with ethylene at a temperature between about 250° F. and about 350° F. in the presence of an acidic catalyst consisting essentially of a major proportion by weight of silica and a minor proportion by weight of alumina, which catalyst has been activated before use in said ethylation by substantial dehydration thereof at a high temperature and low pressure and by treatment with hydrogen at a pressure of at least about 20 p. s. i. and at a temperature between about 400° F. and about 1000° F. for a period of time sufficient to effect substantial activation of said catalyst.

5. The process of claim 4 wherein said catalyst contains about 1 to about 25 weight percent of alumina.

References Cited in the file of this patent

UNITED STATES PATENTS

| 2,274,988 | Matuszak | Mar. 3, 1942 |
| 2,317,494 | Thomas | Apr. 27, 1943 |
| 2,419,599 | Schulze | Apr. 29, 1947 |